(12) United States Patent
Allerton (10) Patent No.: US 9,342,800 B2
(45) Date of Patent: May 17, 2016

(54) STORAGE MODEL FOR INFORMATION RELATED TO DECISION MAKING PROCESS

(75) Inventor: Mark Allerton, Vancouver (CA)

(73) Assignee: SAP SE, Walldorf (DE)

( * ) Notice: Subject to any disclaimer, the term of this patent is extended or adjusted under 35 U.S.C. 154(b) by 567 days.

(21) Appl. No.: 12/708,322

(22) Filed: Feb. 18, 2010

(65) Prior Publication Data
US 2011/0202534 A1    Aug. 18, 2011

(51) Int. Cl.
*G06F 17/30* (2006.01)
*G06Q 10/00* (2012.01)

(52) U.S. Cl.
CPC ....................... *G06Q 10/00* (2013.01)

(58) Field of Classification Search
CPC .......... G06F 17/30616; G06F 17/3071; G06F 17/30011; G06F 17/30038
USPC ................................... 707/738, 756
See application file for complete search history.

(56) References Cited

U.S. PATENT DOCUMENTS

| | | | | |
|---|---|---|---|---|
| 5,987,434 | A * | 11/1999 | Libman | 705/36 R |
| 2002/0143669 | A1* | 10/2002 | Scheer | G06Q 10/087 705/28 |
| 2003/0187700 | A1* | 10/2003 | Bonissone et al. | 705/4 |
| 2003/0229529 | A1* | 12/2003 | Mui et al. | 705/8 |
| 2005/0209876 | A1* | 9/2005 | Kennis et al. | 705/1 |
| 2007/0027919 | A1* | 2/2007 | Mastel | G06Q 30/06 |
| 2008/0177593 | A1* | 7/2008 | Clayton et al. | 705/7 |
| 2009/0144302 | A1* | 6/2009 | Baldwin | 707/100 |
| 2009/0172035 | A1* | 7/2009 | Lessing et al. | 707/104.1 |
| 2009/0248603 | A1* | 10/2009 | Kiersky | G06N 99/005 706/47 |
| 2010/0082646 | A1* | 4/2010 | Meek | G06F 17/3056 707/752 |

OTHER PUBLICATIONS

"RDF From Semantic Web Standards", http://www.w3.org/RDF/, (Feb. 10, 2004), 3 pgs.

* cited by examiner

*Primary Examiner* — Cam-Y Truong
(74) *Attorney, Agent, or Firm* — Schwegman Lundberg & Woessner, P.A.

(57) ABSTRACT

In an embodiment, a method is provided for storing information related to a decision making process. In this method, data items that are associated with a choice, a fact, and/or a decision are accessed. These data items are used in an application that provides a functionality associated with the decision making process. A relationship between the data items is then created based on a context in which the data items are used in the application. The data items and the relationship are stored in a common data structure that is accessible by a different application that provides a different functionality associated with the decision making process.

16 Claims, 9 Drawing Sheets

|  | FOR | AGAINST |
|---|---|---|
| CHEAP HOTELS | 4 | 2 |
| EXPENSIVE HOTELS | 10 | 14 |
| MODERATE HOTELS | 15 | 17 |

STORAGE MODEL FOR INFORMATION RELATED TO DECISION MAKING PROCESS

FIELD

The present disclosure relates generally to information storage. In an example embodiment, the disclosure relates to a model for storing information related to decision making process.

BACKGROUND

Currently, there are a variety of different applications that provide functionalities to assist with decision making processes. For example, an application may be used for cataloging the pros and cons of a scenario. Another application may provide the functionality for conducting analyses of the strengths, weaknesses, opportunities, and threats that may be involved in a particular project.

All these applications use different data and store that data in different ways. These different applications are also typically not designed to share data. For example, an application may provide the functionality to build meeting agendas while another application may be used to prioritize the various meeting agendas. Although these two applications relate to the creation or analysis of meeting agendas, they cannot share data between each other because they are separate programs. As a result, the use of two different applications may, for example, result in the input (and storage) of redundant data.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide techniques for storing information generated by different applications that are used in decision making processes. In general, data from different applications are formatted and stored according to a general data model. In this model, data from the different applications may be parsed into data item units. Additionally, relationships between these different data items are created. These data items, together with their relationships, may then be stored in a common structure that is accessible by the different applications.

Figure 1:
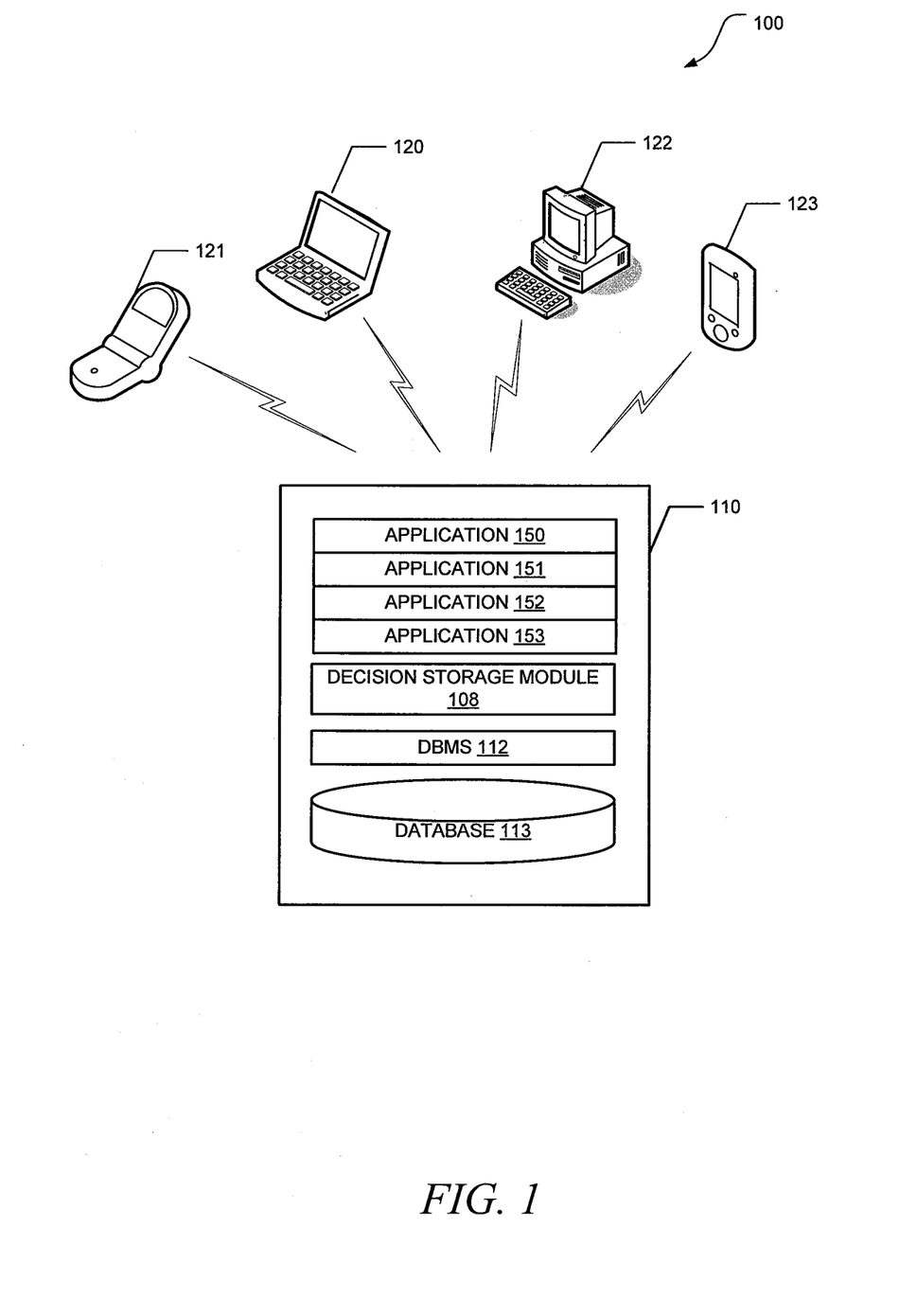
FIG. 1 depicts a block diagram of an example of a system, according to an embodiment, that is adapted to store information related to decision making processes.

FIG. 1 depicts a block diagram of an example of a system 100, according to an embodiment, that is adapted to store information related to decision making processes. The system 100 illustrates an example of a client-server database environment including a computing device 110 (e.g., an application/database server) and client devices 120-123. As an example, the system 100 may be an SAP system (e.g., SAP R/3 system) that is implemented in Advanced Business Application Programming (ABAP), which is a programming language created by the company SAP AG for developing applications (e.g., Web application servers). It should be appreciated that other system topologies may be used in conjunction with other embodiments. The computing device 110 may operate to receive, store, manage, and provide data, which may be received from sources such as client devices 120-123 and/or generated by the computing device 110.

The computing device 110 may include various applications 150-153 (e.g., widgets, applications programs, and applets), a decision storage module 108, a database management system (DBMS) 112, and a database 113. These applications 150-153 are computer programs that provide a variety of functionalities related to decision making processes based, in part, on access of data stored in the database 113. A "decision making process," as used herein, refers to a process used to determine or settle something in dispute. The applications 150-153 provide tools that may be used to make the decision, and this decision may ultimately be made by users or automatically by one or more applications 150-153. For example, one or more of such applications 150-153 may provide cataloging of choices, analysis using strengths, weaknesses, opportunities, and threats (SWOT) methodology, resource planning and any other suitable functions related to decision making processes. Such applications 150-153 may access data stored in, for example, the database 113 by way of interactions with other elements of the computing device 110, such as the decision storage module 108 and the DBMS 112.

Generally, the database management system 112 may comprise any suitable system for managing database instances. For example, the database management system 112 may receive requests for data (e.g., Structured Query Language (SQL) requests from one or more applications 150-153), retrieve requested data from the database 113, and return the requested data to one or more requestors (e.g., client devices 120-123). The applications 150-153 communicate with DBMS 112 over one or more interfaces provided by the DBMS 112. The applications 150-153 may, in turn, support client applications executed by client devices 120-123. Such a client application may, far example, include a Web browser to access and display reports generated by the applications 150-153. In this regard, the computing device 110 may, for example, comprise a Web server to manage interactions with the client devices 120-123.

In the example embodiment of FIG. 1, one or more applications 150-153 may store different data in the database 113. Before the data is stored, the decision storage module 108 may parse the different data and store them according to a data model, as explained in more detail below. As a result, many or all the data used by the applications 150-153 are uniformly formatted and stored in a common data structure, which allows the creation of a semantic network that describes, for example, decisions, choices considered in making the decisions, and/or facts about those choices, as will also be explained in more detail below.

It should be appreciated that the computing device 110 may include other elements that are not shown and may be used during operation thereof, such as any suitable program code, scripts, or other functional data that is executable to interface with other elements of the system 100, other applications, other data files, operating system files, and device drivers. Furthermore, two or more elements of the system 100 may be located remote from one another and may communicate with one another via a network and/or a dedicated connection. Moreover, each displayed element of system 100 may comprise any number of hardware and/or software elements, some of which are located remote from each other element. The elements described herein as communicating with one another are directly or indirectly capable of communicating over any number of different systems for transferring data, including but not limited to, shared memory communication, a local area network (LAN), a wide area network (WAN), a telephone network, a cellular network, a fiber-optic network, a satellite network, an infrared network, a radio frequency network, and any other type of network that may be used to transmit information between devices. Additionally, communication between systems may proceed over any one or more transmission protocols that are or become known, such as Asynchronous Transfer Mode (ATM), Internet Protocol (IP), HyperText Transfer Protocol (HTTP) and Wireless Application Protocol (WAP).

Figure 2:
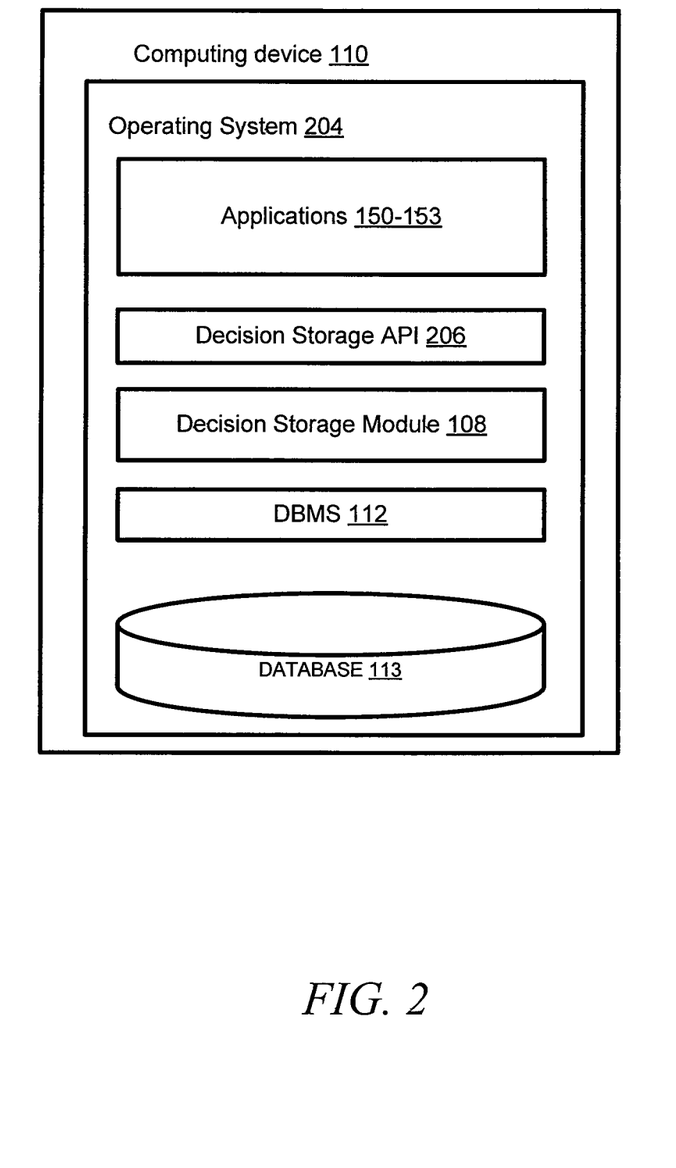
FIG. 2 depicts a detailed block diagram, in accordance with an example embodiment, of various elements included in a computing device.

FIG. 2 depicts a detailed block diagram, in accordance with an example embodiment, of various elements included in a computing device 110. It should be appreciated that the computing device 110 may be deployed in the form of, for example, a server computer, a personal computer (PC), a laptop computer, a tablet PC, a personal digital assistant (PDA), or other computing devices. In an example embodiment, the computing device 110 may be included in a client-server database environment. For example, the computing device 110 may form a part of the same computing device 110 depicted in FIG. 1 that hosts the applications 150-153 and database management system 112. In an embodiment, the computing device 110 may be implemented by set of computing resources providing the appearance of a single device but implemented across two or more devices. Referring to FIG. 2, in various embodiments, the computing device 110 may be used to implement computer programs, logic, applications, methods, processes, or software to store data associated with decision making processes, as described in more detail below.

The computing device 110 executes an operating system 204 that manages other software processes and/or services executing on the computing device 110. These software processes and/or other services may include applications 150-153, a decision storage application programming interface (API) 206, a decision storage module 108, a DBMS 112, and a database 113. As discussed above, the applications 150-153 are used in the decision making process, and the database management system 112 manages database instances. The decision storage module 108 stores data accessed by the applications 150-153 according to a general data model by way of the database management system 112. In particular, the decision storage module 108 may parse data into data item units (or data items) that are associated with decisions, choices considered in making the decisions, and/or facts about the choices. A "data item," as used herein, refers to a distinct and indivisible part of a collection of data. Examples of data items include text strings, scalar values, Boolean values, coordinates, user identities, project names, uniform resource identifiers, times, dates, categorical data, metadata to data, and other data items. A data item is indivisible in that it is not separable into parts. For example, the test string "shopping" is a data item because this word is distinct and is not further separable into parts (e.g., "sho" and "pping") that constitute a complete word, such as "sho" and "pping." In another example, the coordinate "53.2342" is also a data item because this coordinate value is distinct and not further separable into parts (e.g., "53.23" and "42") that constitute a complete coordinate value. In one embodiment, compound structures can be used, but such structures may be composed of data items based on relationships rather than being data items themselves, as will be explained in more detail below. It should be appreciated that a data item may also be referred to as an "atom," and accordingly, the terms "user item" and "atom" may be used interchangeably.

In one example embodiment, the applications 150-53 may interface with the decision storage module 108 by way of the decision storage API 206. Here, the decision storage API 206 is an interface implemented by the decision storage module 108 to enable interaction with other applications 150-53 that are used in the decision-making process by providing, for example, calling conventions that may be employed to use the functionalities of the decision storage module 108.

It should be appreciated that in other embodiments, the computing device 110 may include fewer, more, or different modules apart from those shown in FIG. 2. For example, in an alternate embodiment, the decision storage module 108 may be integrated within the DBMS 112. In yet another embodiment, the applications 150-153 may directly access the functionalities of the decision storage module 108 without use of the decision storage API 206.

Figure 3:
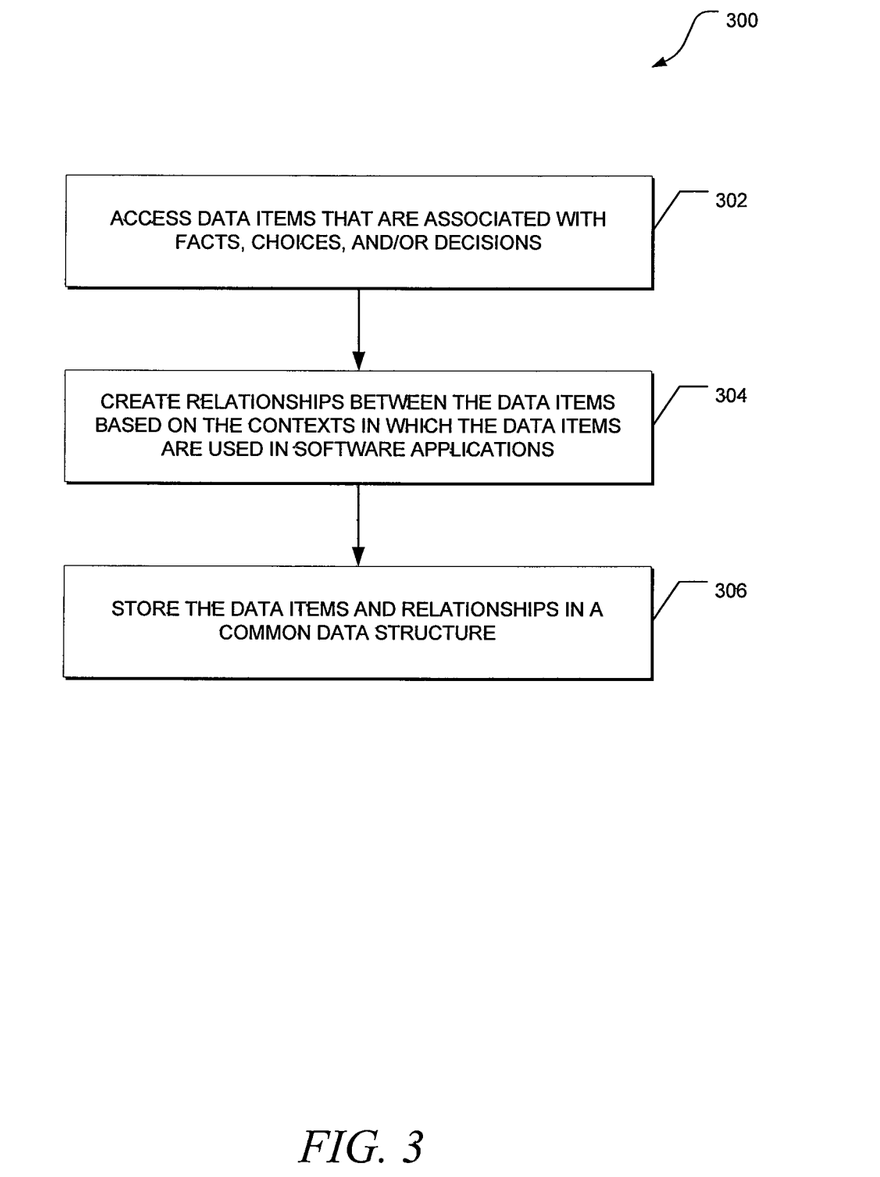
FIG. 3 depicts a flow diagram of a general overview of a method, in accordance with an example embodiment, for storing information related to one or more decision making processes.

FIG. 3 depicts a flow diagram of a general overview of a method 300, in accordance with an example embodiment, for storing information related to one or more decision making processes. In one embodiment, the method 300 may be implemented by the decision storage module 108 and employed in the computing device 110 depicted in FIG. 2. As depicted in FIG. 3, data items that are associated with facts, choices, and/or decisions are accessed at 302. These data items may be parsed from data used by applications associated with the decision making processes. Alternatively, the data itself may be a collection of data items that does not need to be parsed. As used herein, the access of data items may include, for example, receiving the data items, reading the data items from a data source, or other access operations. It should also be noted that in one embodiment, the data items can be accessed by way of the decision storage application programming interface, as discussed above.

Relationships between each data item are then created at 304 based on the context in which the data items are used in the application. A relationship is an association or dependence between two or more data items. The "context" in which the relationship is created refers to the setting in which the data items are used in the application. For example, in one embodiment, the relationships can be created based on associations between data items as defined in a database table, as explained in more detail below. In an alternate embodiment, relationships may be created based on the categorization of each data item as a choice, a fact, or a decision, as is also explained in more detail below.

With the relationships created, the data items and their relationships are then stored in a common data structure at 306. A data structure provides context for the organization of data. For example, a common data structure may be a database structure of a database table. In another example, a common data structure may be an eXtensible markup language (XML) structure of an XML file. Other examples of data structures include structures associated with database tables, arrays, linked lists, and indexes.

The storage of different data items from different applications based on a general data model may facilitate, for example, the storage of the data items in a centralized storage location. Different applications that provide different functionalities used in the decision-making process can therefore access a common set of data (or data items) from this centralized storage location. By centralizing the storage of data items, duplicate or redundant data items may possibly be minimized or eliminated. Additionally, the centralization of all data items from different applications may possibly facilitate identifying gaps in the information. For example, if a number of data items are classified as choices, but not related to any decision, then a user may be prompted to identify or define the relationship between these data items and one or more decisions.

Figure 4A:
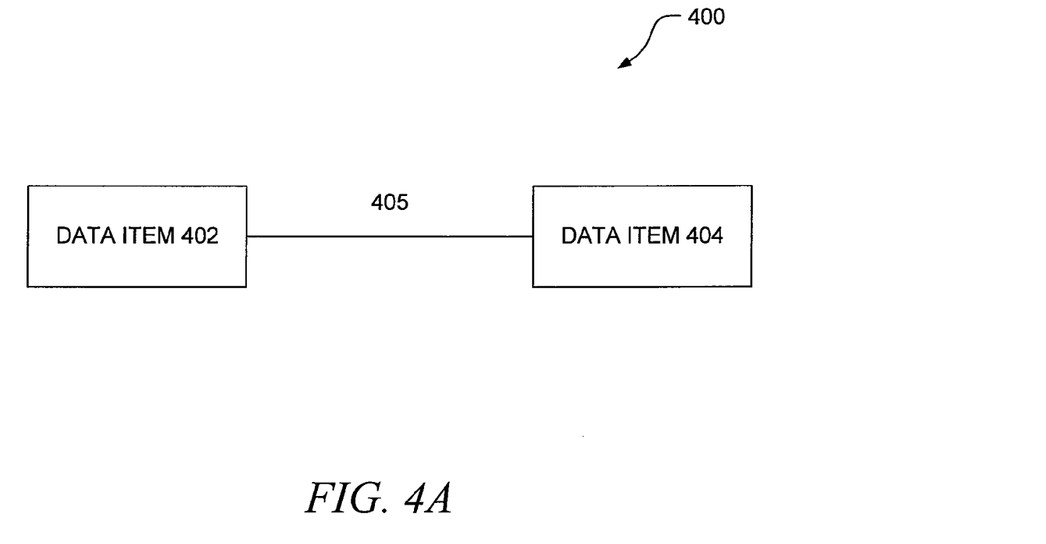
FIGS. 4A and 4B depict graph diagrams illustrating data items and the relationships between these data items, according to various example embodiments.
Figure 4B:
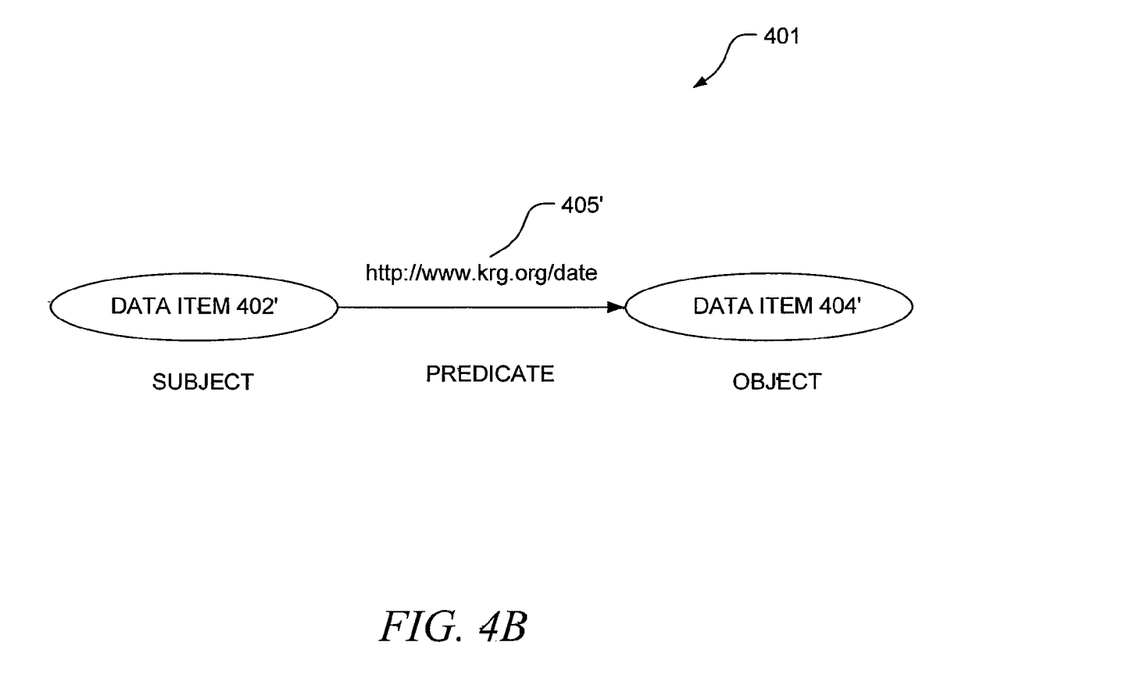

FIGS. 4A and 4B depict graph diagrams illustrating data items 402, 402', 404, and 404' and the relationships between these data items 402, 402', 404, and 404', according to various example embodiments. As depicted in FIG. 4A, the graph diagram 400 depicts data items 402 and 404 as nodes and their relationship 405 as a line or arc connecting the data items 402 and 404. It should be appreciated that in the embodiments described herein, each data item 402 or 404 may be categorized as a decision, choice concert in the decision, or fact about the choice. Inherently, decisions, choices, and facts are related to each other because a decision cannot be made without choices and facts about these choices.

It should be appreciated that the data items 402 and 404 and their relationship 405 illustrated in FIG. 4A may be represented and stored using a variety of different data models. For example, in one embodiment, the data items 402 and 404 and the relationship 405 may be represented using Resource Description Framework (RDF). In general, RDF is a method for conceptual description or modeling of information that is implemented in, for example, web resources using a variety of syntax formats. Although RDF is a language designed for representing information about resources in the World Wide Web (WWW), RDF may also be used in embodiments of the present invention to represent data items 402 and 404 and their relationship 405.

FIG. 4B depicts a graph diagram 401 illustrating an RDF representation of data items 402' and 404' and their relationship 405'. In RDF, information may be categorized or identified as a subject, a predicate, or an object, and it should be appreciated that the underlying structure of an RDF expression is a collection of triples, with each triple including a subject, a predicate, and an object. A set of such triples is an RDF graph. The graph diagram 401 depicts such an RDF graph where data items 402' and 404' are depicted as nodes and their relationship 405' is depicted as an arc connecting one node to another node.

In this example, the data item 402' is identified as a subject, the data item 404' is identified as an object, and their relationship is identified as a predicate. The subject denotes a resource, and the predicate denotes traits or aspects of the resource and expresses a relationship between the subject and the object. For example, one way to represent the statement "The car has the color red" in RDF is as the triple: a subject "the car," a predicate "has the color," and an object "red." The predicate in RDF may be defined using a Uniform Resource Identifier (URI), which is a string of characters used to identify a name or a resource on the Internet. In addition to identifying a relationship 405' between the subject and object, the predicate also defines a type of relationship between them. For example, the predicate URI "http://www.kry.org/date" includes information (e.g., date) regarding the type of relationship 405' between the subject data item 402' and the object data item 404'. This relationship type can include, for example, an "is a" relationship, a "pro of" relationship, a "con of" relationship, an "option in" relationship, or other relationship types that describe the relationship between data items 402' and 404'.

It should be noted that RDF is an abstract data model with several serialization formats. For example, RDF may be formatted in XML, as explained in more detail below. As a result, the particular way in which a triple is encoded in RDF may vary depending on the format used.

Figure 5:
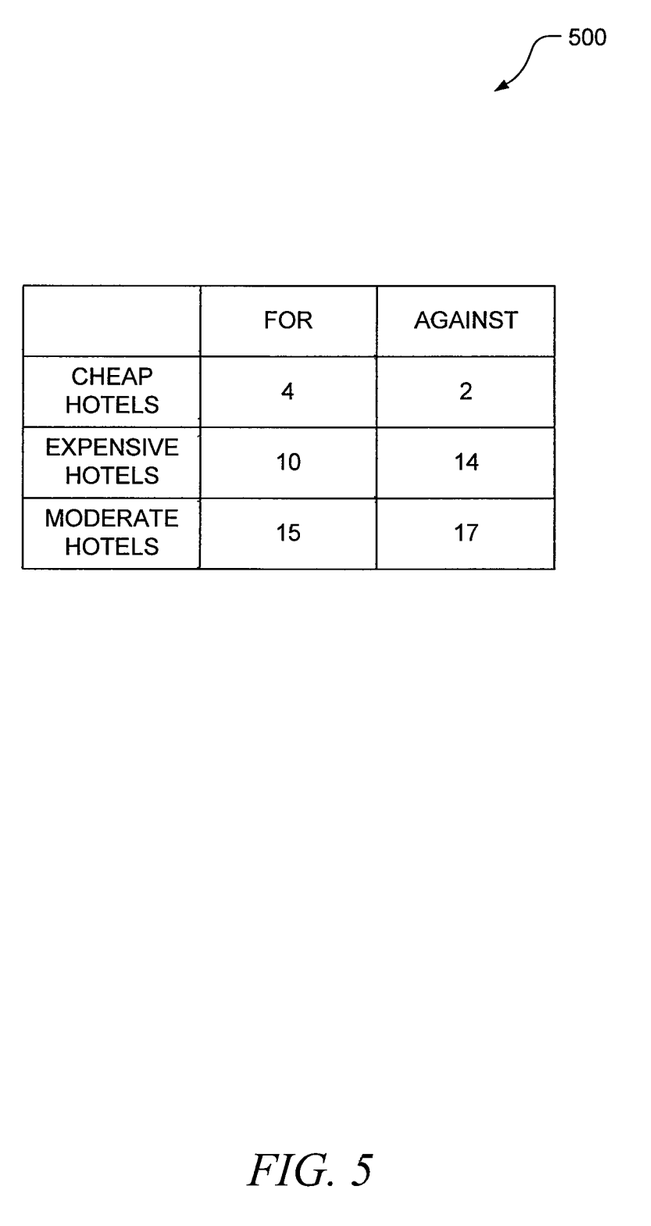
FIG. 5 depicts a diagram of a database table used in the creation of relationships between data items, in accordance with an example embodiment.

FIG. 5 depicts a diagram of a database table 500 used in the creation of relationships between data items, in accordance with an example embodiment. As discussed above, relationships between data items may be created based on the context in which the data items are used in the applications. In one embodiment, relationships between data items may be identified based on associations between the data items as defined in a database table, such as the database table 500.

As depicted, the database table 500 stores information regarding the tally of votes that are either for ("FOR") or against ("AGAINST") various choices (e.g., "cheap hotels," "expensive hotels," and "moderate hotels"). Relational databases permit the database table 500 to have an arbitrary number of columns and rows. In one example, each choice defined in each row (e.g., "cheap hotels," "expensive hotels," or "moderate hotels") is a data item. Each tally or value associated with a choice (e.g., 4, 2, 10, 14, 15, or 17) also is a data item. Given that the data items are stored in a relational database table 500, the data items are related to each other because information stored in a relational database table 500 is inherently related. In this example, the column names (e.g., "FOR" and "AGAINST") can be identified as the type of relationship between the data items. As such, in the creation of a relationship between data items, the column names of the database table 500 are identified and these column names are assigned to the relationships.

In an example embodiment where RDF is used, the subject of a triple is the name associated with a choice (e.g., "cheap hotels," "expensive hotels," or "moderate hotels"), the object (e.g., 4, 2, 10, 14, 15, or 17) corresponds to the values in the cells of the database table 500, and the predicate corresponds to the column names (e.g., "FOR" or "AGAINST").

It should be appreciated that there are a variety of different techniques to create the relationship between data items because each application may use the data items in different ways. That is, the contexts in which the data items are used in different applications are different. For example, a particular application may provide the functionality to allow a set of named data items to be arranged in a two-dimensional space where one dimension is named as "Relative Market Share" and another dimension is named "Market Growth Rate."

Here, the set of named data items is text and two other data items with scalar values can represent the positions of the set of named data items. Each data item with a scalar value can be related with a text data item, and the name of the dimension ("Relative Market Share" or "Market Growth Rate") can be identified as a type of the relationship.

In yet another example, relationships may be predefined between the different data items, and these predefined relationships can be created based on the categorization of each data item. For example, a relationship may be predefined between a decision and a choice. Similarly, another relationship may be predefined between a choice and a fact. Each data item is categorized as a choice, a fact, or a decision. Based on the categorization, the predefined relationships may be applied or created between the data items. In an illustrative example, two data items are accessed where one data item is categorized as a decision and another data item is categorized as a fact. Given that no relationship is predefined between a decision and a fact, no relationship is created between the data items. However, if one data item is categorized as a decision and the other data item is otherwise categorized as a choice, then a relationship is created between these two data items based on the predefined relationship.

Data items may be categorized based on a variety of different techniques. For example, an application can automatically assign a category to a particular data item based on the context in which this data item is used in the application. In another example, a decision storage module may include filters that filter out data items that do not meet a certain predefined criteria. The data items that are filtered may be assigned to particular categories.

Figure 6:
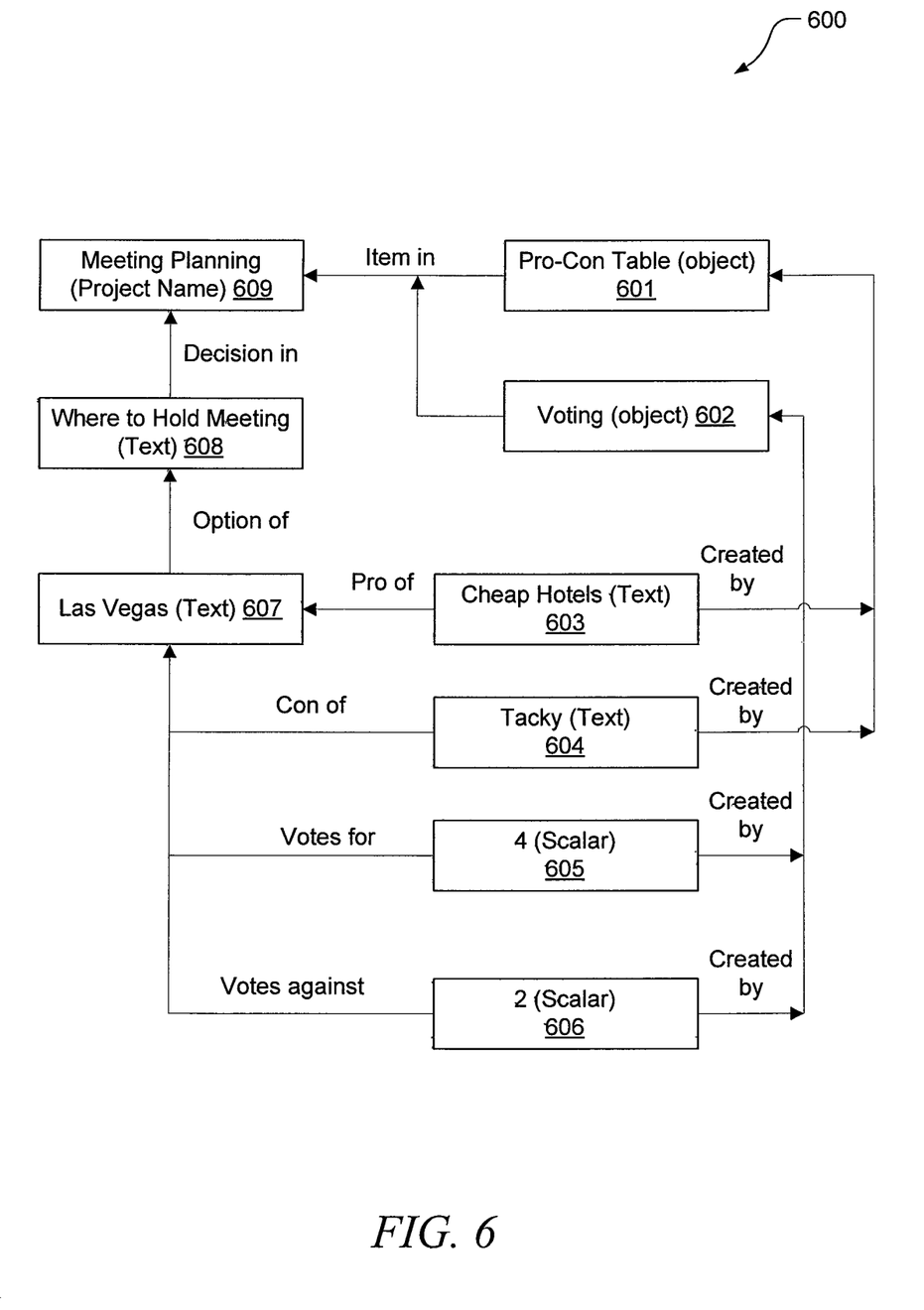
FIG. 6 depicts a data flow diagram illustrating a semantic network, in accordance with an example embodiment, that describes all the choices and facts considered in making a decision.

FIG. 6 depicts a data flow diagram illustrating a semantic network 600, in accordance with an example embodiment, that describes all the choices and facts considered in making a decision. The semantic network 600 is a graph comprised of nodes that represent data items 601-609 and arcs or lines that describe the relationship between the nodes, resulting in a data flow diagram. Additionally, the semantic network 600 also shows the relationship types. For example, a line connecting the data item 605 ("4" scalar value) with the data item 607 ("Las Vegas" text) shows a relationship exists between the data items 607 and 605. Additionally, the relationship type is a "votes for" relationship, which indicates that there are a total of four votes for the choice of the "Las Vegas" option.

The semantic network 600 describes the decision, all the choices considered in making the decision, and all the facts about the choices. Different applications may contribute to different portions of the semantic network 600. For example, a particular application may provide the functionality to generate project names (data item 609). Another application may provide the functionality to only generate a pro-con table (data item 601). Given that all the applications create and store data items associated with facts, choices, and/or decisions in a common data structure, the semantic network 600 can be constructed to show all the choices and facts in making a particular decision. Otherwise, without this common data structure, each application has only a portion of the complete data set and can therefore only show a limited view of the choices and facts considered in making a particular decision.

Figure 7:
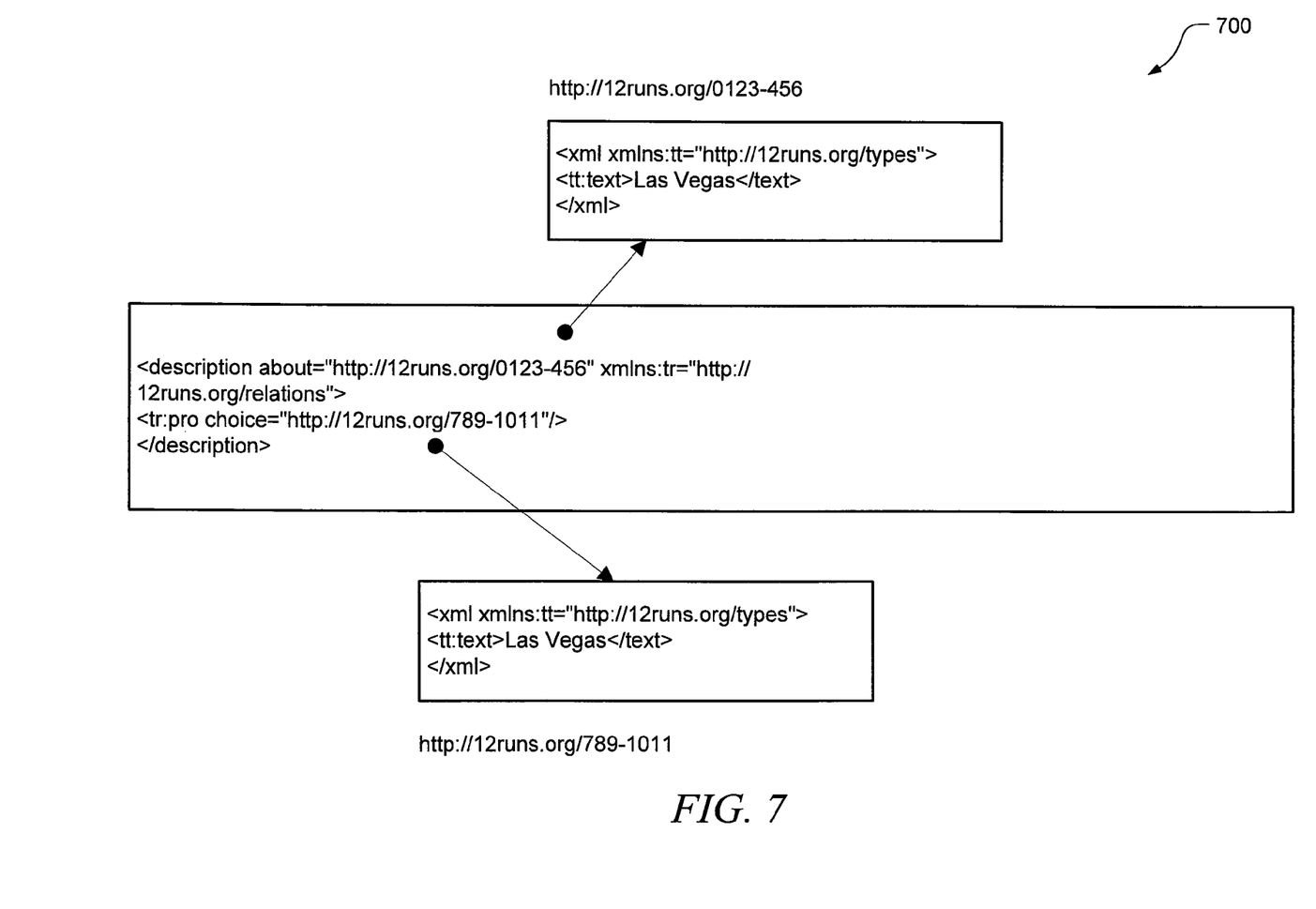
FIG. 7 depicts a diagram illustrating the storage of data items in an eXtensible markup language (XML) file, in accordance with an example embodiment.

FIG. 7 depicts a diagram illustrating the storage of data items in various XML files 700, in accordance with an example embodiment. As discussed earlier, the data items, relationships, and relationship types can be stored in a variety of different data structures, such as an XML structure. In the example of FIG. 7, each RDF triple set (subject, predicate, and object) is formatted in XML and stored in the XML files 700. In XML format, each data item may be enclosed within the characters "<" and ">" and the triple sets may be separated by periods. Any suitable applications that provide functionalities associated with the decision making process can access one or more of these XML files 700 to read, modify, and/or store data items, relationships between the data items, and relationship types.

Figure 8:
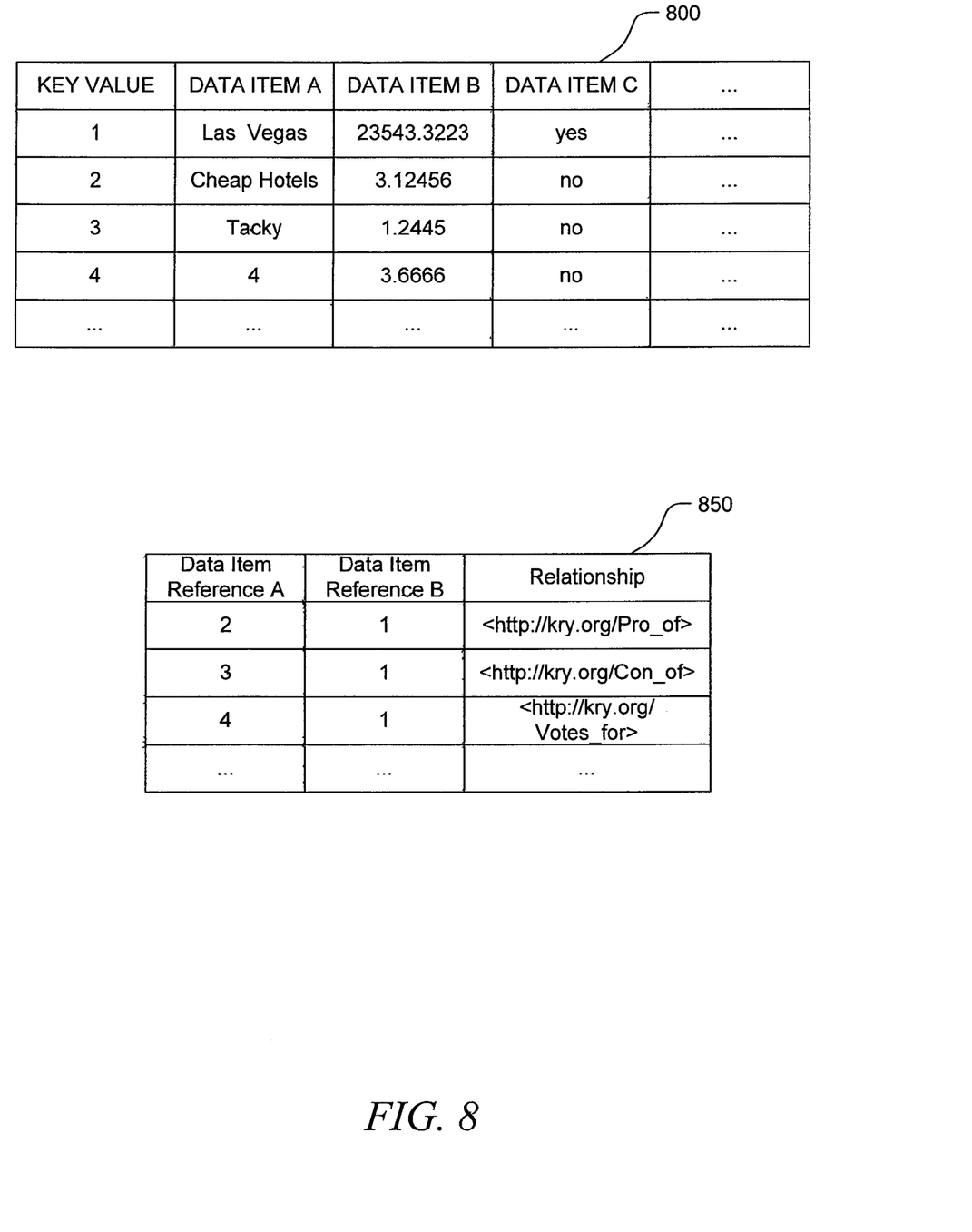
FIG. 8 depicts a diagram illustrating the storage of items in database tables, in accordance with yet another example embodiment.

FIG. 8 depicts a diagram illustrating the storage of items in database tables 800 and 850, in accordance with yet another example embodiment. Here, the "first" database table 800 is configured to store data items while the "second" database table 850 is configured to store the relationships between the data items and the relationship types. In the first database table 800, each column stores a different type of data item, and each row provides a data value for each column. A single data item or a group of data items by be referenced in the first database table 800 based on the column name and key values associated with each row.

The second database table 850 is configured to store each relationship between two or more data items in the form of foreign keys that reference the first data table 800. The second database table 850 therefore does not store the data items themselves, but rather stores foreign keys (or other pointers) that reference the data items stored elsewhere. From these foreign keys, relationships between data items can be identified. For example, each row in the second database table defines an RDF triple set, where the first column ("Data Item Reference A") references a subject, the second column ("Data Item Reference B") references an object, and the third column ("Relationship") includes the types of relationships (or predicate) between the subject and the object. Similarly, any suitable applications that provide functionalities associated with decision-making processes can access these database tables 800 and 850 to read, modify, and/or store data items, relationships between the data items, and relationship types.

Figure 9:
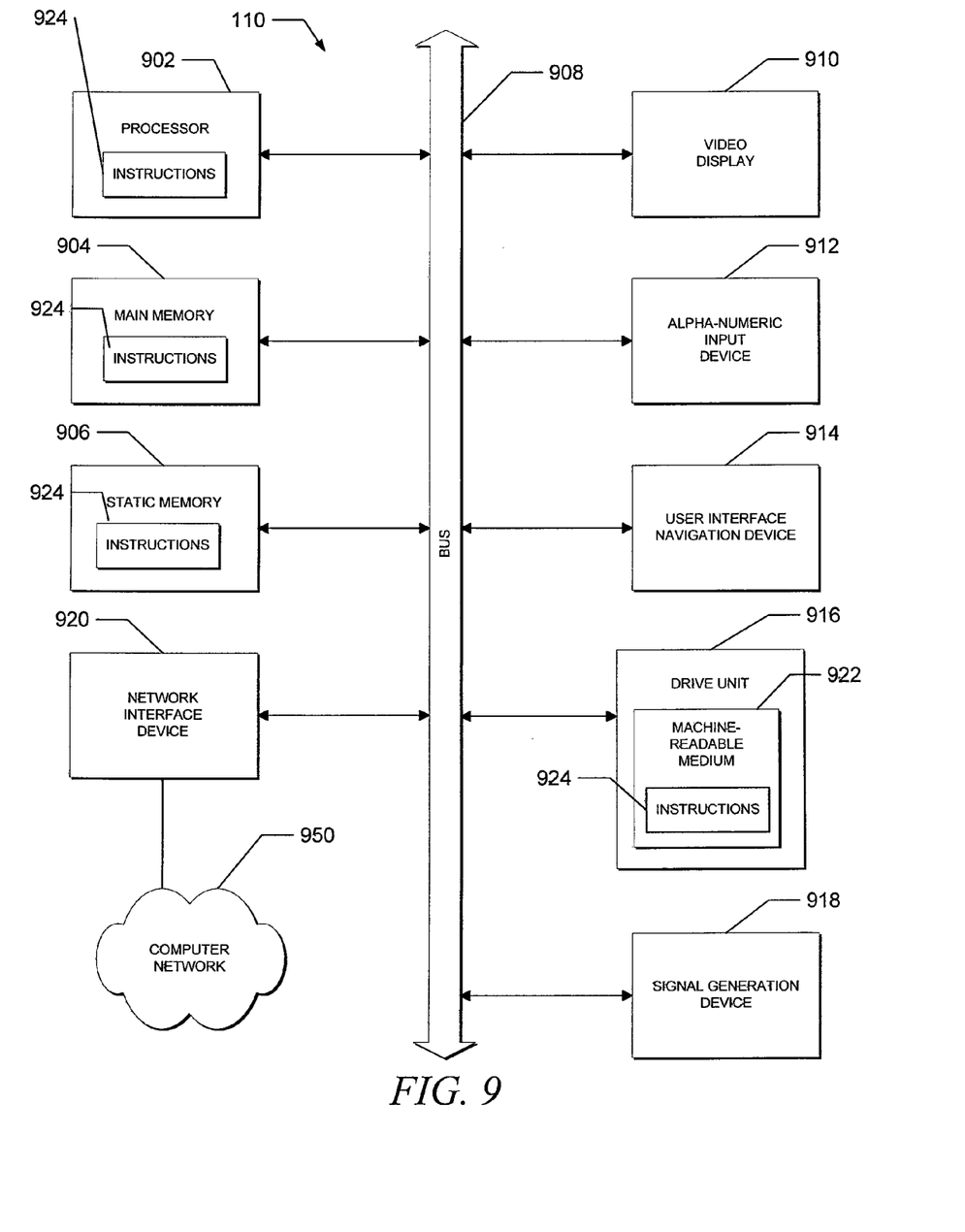
FIG. 9 depicts a block diagram of a machine in the example form of a computing device within which may be executed a set of instructions for causing the machine to perform any one or more of the methodologies discussed herein.

FIG. 9 depicts a block diagram of a machine in the example form of a computing device 110 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Embodiments may also, for example, be deployed by Software-as-a-Service (SaaS), Application Service Provider (ASP), or utility computing providers, in addition to being sold or licensed via traditional channels.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 110 includes a processor 902 (e.g., a central processing unit (CPU), a microprocessor, or a graphics processing unit (GPU)), a main memory 904 (e.g., random access memory (a type of volatile memory)), and static memory 906 (e.g., static random access memory (a type of volatile memory)), which communicate with each other via bus 908. The computing device 110 may further include video display unit 910 (e.g., a plasma display, a liquid crystal display (LCD) or a cathode ray tube (CRT)). The computing device 110 also includes an alphanumeric input device 912 (e.g., a keyboard), a user interface (UI)

navigation device 914 (e.g., a mouse), a disk drive unit 916, a signal generation device 918 (e.g., a speaker), and a network interface device 920.

The disk drive unit 916 (a type of non-volatile memory storage) includes a machine-readable medium 922 on which is stored one or more sets of data structures and instructions 924 (e.g., software) embodying or utilized by any one or more of the methodologies or functions described herein. The data structures and instructions 924 may also reside, completely or at least partially, within the main memory 904 and/or within the processor 902 during execution thereof by computing device 110, with the main memory 904 and processor 902 also constituting machine-readable, tangible media.

The data structures and instructions 924 may further be transmitted or received over a computer network 950 via network interface device 920 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 110) or one or more hardware modules of a computer system (e.g., a processor 902 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a processor 902 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a processor 902 (e.g., a general-purpose processor) configured using software, the processor 902 may be configured as respective different hardware modules at different times. Software may accordingly configure the processor 902, for example, to constitute a particular hardware module at one instance of time and to constitute a different hardware module at a different instance of time.

Modules can provide information to, and receive information from, other hardware modules. For example, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 902 or processor-implemented modules. The performance of certain of the operations may be distributed among the one or more processors 902, not only residing within a single machine, but deployed across a number of machines. In some example embodiments, the processor or processors 902 may be located in a single location (e.g., within a home environment, an office environment or as a server farm), while in other embodiments, the processors 902 may be distributed across a number of locations.

While the embodiments are described with reference to various implementations and exploitations, it will be understood that these embodiments are illustrative and that the scope of the embodiment(s) is not limited to them. In general, techniques for storing data items associated with decisions, choices, and/or facts may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of storing information related to a decision making process, the method comprising:

accessing a first and a second pluralities of data items that are each plurality of data items associated with at least one of a choice, a fact, or a decision, the first plurality of data items being used in a first application that provides a first functionality associated with the decision making process, the second plurality of data items being used in a second application that provides a second functionality associated with the decision making process, the second functionality different from the first functionally;

creating, using a processor, a first relationship between the first plurality of data items based on a context in which the first plurality of data items is used in the first application;

creating a second relationship between the second plurality of data items based on the context in which second plurality of data items is used in the second application;

formatting the first and second pluralities of data items and the first and second relationships into a common data structure;

storing the formatted first and second pluralities of data items and the formatted first and second relationships in the common data structure that is accessible by a different application that provides a different functionality associated with the decision making process, wherein the first application stores the first plurality of data items in a database table, and wherein the creation of the first relationship comprises identifying the relationship between the first plurality of data items based on an association between the first plurality of data items as defined in the database table;

identifying a first name for a column in the database table;

linking the first name to the first relationship, the first name defining a type of the first relationship between the first plurality of data items;

identifying a second name for a column in the database table; and linking the second name to the second relationship, the second name defining a type of the second relationship between the second plurality of data items.

2. The method of claim 1, further comprising categorizing each data item of the first plurality of data items as at least one of the choice, the fact, or the decision, wherein the creation of the first relationship is based on the categorization.

3. The method of claim 1, wherein each data item of the first plurality of data items is a text string, a scalar value, a Boolean value, a coordinate, a user identity, a project name, or a Uniform Resource Identifier.

4. The method of claim 1, wherein the first relationship is defined by a foreign key that points to a primary key of a database table.

5. The method of claim 1, further comprising generating a semantic network that describes the decision, the choice considered in making the decision, and the fact about the choice.

6. The method of claim 1, further comprising storing the first plurality of data items in a first database table and storing relationships between the first plurality of data items and relationship types in a second database table, the relationships between the first plurality of data items being in the form of foreign keys that reference the first data table, the foreign keys enabling the identification of the relationships between the first plurality of data items, each column in the first database table storing a different type of data item and each row in the first database table providing a data value for each column, wherein a single data item or a group of data items are referenced in the first database table based on the column name and one or more key values associated with each row.

7. A non-transitory machine-readable medium that stores instructions, which, when performed by a machine, cause the machine to perform operations comprising:

accessing a first and a second pluralities of data items that are each plurality of data items associated with at least one of a choice, a fact, or a decision, the first plurality of data items being used in a first application that provides a first functionality associated with a decision making process, the second plurality of data items being used in a second application that provides a second functionality associated with the decision making process, the second functionality different from the first functionally;

creating a first relationship between the first plurality of data items based on a context in which the first plurality of data items is used in the first application;

creating a second relationship between the second plurality of data items based on the context in which second plurality of data items is used in the second application;

formatting the first and second pluralities of data items and the first and second relationships into a common data structure;

storing the formatted first and second pluralities of data items and the formatted first and second relationships in the common data structure that is accessible by a different application that provides a different functionality associated with the decision making process, wherein the first application stores the first plurality of data items in a database table, and wherein the creation of the first relationship comprises identifying the relationship between the first plurality of data items based on an association between the first plurality of data items as defined in the database table;

identifying a first name for a column in the database table;

linking the first name to the first relationship, the first name defining a type of the first relationship between the first plurality of data items;

identifying a second name for a column in the database table; and linking the second name to the second relationship, the second name defining a type of the second relationship between the second plurality of data items.

8. The machine-readable medium of claim 7, wherein the first plurality of data items and the first relationship between the first plurality of data items define a semantic network that describes the decision, the choice considered in making the decision, and the fact about the choice.

9. The machine-readable medium of claim 7, wherein the application is adapted to store the plurality of data items in a database table; and wherein the operation of creating the first relationship comprises identifying the first relationship between the first plurality of data items based on an association between the first plurality of data items as defined in the database table.

10. The machine-readable medium of claim 7, wherein the operations further comprise categorizing each data item of the first plurality of data items as at least one of the choice, the fact, or the decision, wherein the creation of the first relationship is based on the categorization.

11. The machine-readable medium of claim 7, wherein the type of the first relationship is defined in a Uniform Resource Identifier.

12. A computing device comprising:

at least one processor; and a memory in communication with the at least one processor, the memory being configured to store a decision storage module that is executable by the at least one processor, the decision storage module having instructions that when executed by the at least one processor, cause operations to be performed, the operations comprising:

accessing a first and a second pluralities of data items that are each plurality of data items associated with at least one of a choice, a fact, or a decision, the first plurality of data items being used in a first application that provides a first functionality associated with a decision making process, the second plurality of data items being used in a second application that provides a second functionality associated with the decision making process, the second functionality different from the first functionally;

creating a first relationship between the first plurality of data items based on a context in which the first plurality of data items is used in the first application;

creating a second relationship between the second plurality of data items based on the context in which second plurality of data items is used in the second application;

formatting the first and second pluralities of data items and the first and second relationships into a common data structure;

storing the formatted first and second pluralities of data items and the formatted first and second relationships in the common data structure that is accessible by a different application that provides a different functionality associated with the decision making process, wherein the first application stores the first plurality of data items in a database table, and wherein the creation of the first relationship comprises identifying the relationship between the first plurality of data items based on an association between the first plurality of data items as defined in the database table;

identifying a first name for a column in the database table;

linking the first name to the first relationship, the first name defining a type of the first relationship between the first plurality of data items;

identifying a second name for a column in the database table; and linking the second name to the second relationship, the second name defining a type of the second relationship between the second plurality of data items.

13. The computing device of claim 12, wherein the memory is further configured to store a decision storage application interface (API), wherein the first plurality of data items is accessed by way of the decision storage API.

14. The computing device of claim 12, wherein the operations further comprise categorizing each data item of the first plurality of data items as at least one of the choice, the fact, or the decision, wherein the creation of the first relationship is based on the categorization.

15. The computing device of claim 12, wherein the operations further comprise generating a semantic network that describes the decision, the choice considered in making the decision, and the fact about the choice.

16. The computing device of claim 12, wherein the memory is further configured to store an eXtensible Markup Language (XML) file, and wherein the common data structure is an XML structure of the XML file.

* * * * *